United States Patent
Coppock et al.

(10) Patent No.: US 11,898,020 B2
(45) Date of Patent: Feb. 13, 2024

(54) PHENOLIC FOAM AND METHOD OF MANUFACTURE THEREOF

(71) Applicant: Kingspan Holdings (IRL) Limited, Cavan (IE)

(72) Inventors: Vincent Coppock, Cheshire (GB); Lynne Ripley, Derbyshire (GB); Ruud Zeggelaar, Arnhem (NL)

(73) Assignee: KINGSPAN HOLDINGS (IRL) LIMITED, Cavan (IE)

( * ) Notice: Subject to any disclaimer, the term of this patent is extended or adjusted under 35 U.S.C. 154(b) by 376 days.

(21) Appl. No.: 17/264,664

(22) PCT Filed: Jul. 29, 2019

(86) PCT No.: PCT/EP2019/070370
§ 371 (c)(1),
(2) Date: Jan. 29, 2021

(87) PCT Pub. No.: WO2020/025544
PCT Pub. Date: Feb. 6, 2020

(65) Prior Publication Data
US 2021/0230388 A1    Jul. 29, 2021

(30) Foreign Application Priority Data

Jul. 30, 2018 (GB) .................................. 1812404

(51) Int. Cl.
*C08J 9/00* (2006.01)
*C08L 61/06* (2006.01)

(52) U.S. Cl.
CPC .............. *C08J 9/0023* (2013.01); *C08L 61/06* (2013.01); *C08J 2203/142* (2013.01); *C08J 2203/162* (2013.01); *C08J 2205/052* (2013.01); *C08J 2361/10* (2013.01); *C08J 2467/02* (2013.01)

(58) Field of Classification Search
CPC ................ C08J 9/0023; C08J 2203/142; C08J 2203/162; C08J 2205/052; C08J 2361/10; C08J 2467/02; C08J 9/0033; C08J 9/0038; C08J 9/0061; C08J 9/0066; C08J 9/144; C08J 2201/026; C08J 9/141; C08J 2361/04; C08J 9/00; C08L 61/06
See application file for complete search history.

(56) References Cited

U.S. PATENT DOCUMENTS

| | | | |
|---|---|---|---|
| 4,444,912 A | 4/1984 | Carlson et al. | |
| 6,476,090 B1 | 11/2002 | Arito et al. | |
| 2002/0198268 A1* | 12/2002 | Harris | C08J 9/14 521/50 |
| 2013/0072589 A1 | 3/2013 | Coppock et al. | |
| 2016/0326331 A1 | 11/2016 | Hamajima et al. | |

FOREIGN PATENT DOCUMENTS

| | | | |
|---|---|---|---|
| EP | 0170357 B1 | 4/1989 | |
| EP | 1095970 A4 | 2/2003 | |
| EP | 3275926 A1 | 1/2018 | |
| JP | 2011219621 A | 11/2011 | |
| WO | WO-9708230 A1 | 3/1997 | |
| WO | WO-2006114777 A1 | 11/2006 | |
| WO | WO-2007029222 A1 | 3/2007 | |
| WO | WO-2018158461 A2 * | 9/2018 | ......... B29C 44/1228 |

OTHER PUBLICATIONS

International Search Report and Written Opinion of the International Searching Authority, issued in PCT/EP2019/070370, dated Oct. 24, 2019; ISA/EP.

* cited by examiner

*Primary Examiner* — Irina S Zemel
(74) *Attorney, Agent, or Firm* — Harness, Dickey & Pierce, P.L.C.

(57) ABSTRACT

A thermal insulating phenolic foam and method of manufacture thereof is provided. A phenolic foam is formed by foaming and curing a phenolic resin composition that comprises a phenolic resin, an acid catalyst, a blowing agent comprising a hydrocarbon having 6 carbon atoms or less, and an alkoxy alcohol. The resulting foam has low thermal conductivity and has excellent long term thermal stability.

20 Claims, No Drawings

PHENOLIC FOAM AND METHOD OF MANUFACTURE THEREOF

CROSS-REFERENCE TO RELATED APPLICATIONS

This application is a 371 U.S. National Phase of International Application No. PCT/EP2019/070370, filed Jul. 29, 2019, which claims priority to British Patent Application No. GB 1812404.0, filed Jul. 30, 2018. The entire disclosures of the above applications are incorporated herein by reference.

FIELD

The present invention relates to phenolic foams and methods of manufacture thereof. The phenolic foams of the present invention have excellent thermal insulation performance, and are formed using blowing agents which have low environmental impact.

BACKGROUND INFORMATION

Historically, phenolic resins have been the preferred thermosetting resins to use for foam insulation requiring low toxicity, low smoke emission and self-extinguishing capability in a fire situation. Phenolic insulation foams in the form of flat boards and curved sections with appropriate facings are used for applications in buildings, and transport. Examples are insulation foam boards for cavity walls, floors, roofs, cold storage and foam sections for pipe insulation. Phenolic foam products provide both excellent thermal insulation and fire resistance.

Phenolic resole resins which are used in the manufacture of phenolic foams are condensation polymers of phenol and formaldehyde made under aqueous basic conditions with an excess of formaldehyde. In general, phenolic resins used in foam manufacture are viscous liquids with water concentrations of from about 1 to 25 wt % and have methylol groups as reactive substituents. Cross-linked phenolic foam may be formed by heating and curing a mixture of phenolic resin, blowing agent, surfactant and acid catalyst. Upon addition of an acid catalyst to a mixture comprising resin, blowing agent and surfactant, an exothermic reaction occurs between methylol groups and phenolic rings to form methylene bridges, which cross link polymeric chains, and water of condensation polymerisation is produced. The resole resin composition, the quantity and nature of the acid curing catalyst and the chemical and physical properties of the blowing agent and any surfactant present in the foam reactants greatly influence the ability to control the exothermic reaction and the ability to form closed cell foam.

Blowing agents having low thermal conductivity are used to form thermal insulating foams. As the gas volume of a foam may account for up to about 95% of the volume of a foam, the amount and nature of the blowing agent trapped in the foam has a significant impact on the thermal insulating performance of the foam. In order to form thermal insulating foam, a total closed-cell content of greater than 85 percent is generally required, as one of the main determinants in the thermal performance of foam is the ability of the cells of the foam to retain blowing agent having a low thermal conductivity.

European Patent No. 0170357 describes a process for the formation of phenolic foams by foaming and curing a phenolic resin with a halogenated hydrocarbon blowing agent, preferably a chlorofluorocarbon (CFC), in the presence of a mineral acid, and a cell stabilizer. The phenolic resin preferably comprises water which is present in an amount of from about 10 to 27 wt %. The phenolic resin may optionally comprise aliphatic or alicyclic hydroxyl compounds and esters thereof, such as ethylene glycol, propylene glycol, diethylene glycol or dipropylene glycol. Example 4 describes the manufacture of a continuous phenolic foam laminate having glass fibre facings; the phenolic foam had a closed cell content of 97% and a k value of 0.015 W/m·K. The blowing agents used to form the foam were Freon® blowing agents, specifically 1,1,2-trichloro-1,2,2-trifluoroethane and trichlorofluoromethane. The phenolic resin composition formed in Example 4C has a water content of 9.9 wt %. This resin also contains monoethylene glycol as a diluent to further lower viscosity that can be calculated to be 13.6% by weight of resin. These "dilutions" help achieve a low phenolic resin viscosity of 1380 centistokes at 25° C., (1684 mPa·s at 25° C. with a resin density of 1.22 g/cm³). This is advantageous as it facilitates easy pumping of the phenolic resin materials through conduits and manifolds in a factory.

While CFC blowing agents were preferred in the 1980s as a consequence of their low thermal conductivity values, they have a detrimental effect on the environment and their use in foam production has been phased out in Europe as mandated by the Montreal Protocol. Hydrogenated chlorofluorocarbons (HCFCs) and hydrogenated fluorocarbons (HFCs) replaced CFCs but these agents are also being phased out due to environmental concerns. Hydrocarbon blowing agents which have a low environmental impact evolved as replacement blowing agents though hydrocarbons inherently have higher thermal conductivity values.

Rickle et al. in the Journal of Cellular Plastics Vol. 24 1988 page 73, advises that high water content in phenolic resin causes open cell foam formation. As outlined above, having a high closed cell content is highly desirable to maximise foam insulation performance, as this facilitates the retention of blowing agent having low thermal conductivity within the cells. While Rickle et al. teaches that low water content in the resin is desirable for closed cell foam formation, Rickle et al. also cautions that if the water content of the resin is too low, open cell foams can also result if the exotherm raises the temperature of the reactants too quickly. Furthermore, the exothermic cross-linking reaction which is catalysed by the acid catalyst also generates water in a condensation reaction. Hence, the water content of the phenolic resin foamable composition and cure temperature need to be carefully controlled to avoid the formation of open cell foam. Rickle et al. indicates the resin viscosity should approximately be 3000 centipoise, (when making foam), and when much higher viscosities than this are obtained, mixing and handling the resin becomes difficult. The total water content of the foamable composition formed in experimental section (c) of Rickle et al. is approximately 4 wt %, whereas the water content in the phenolic resin itself was approximately 5%.

Rickle et al. employs CFC blowing agents to blow the foams described therein. FIG. 5 shows the lowest thermal conductivity for phenolic foam blown with Freon® 11 was achieved with a phenol resin having a water content of 4 to 5%. Rickle et al. advocates using phenol monomer or polyglycols as diluents to aid processing and dissipation of the heat generated in the exothermic curing reaction.

Despite controlling the exothermic curing reaction by optimising water and diluent content, Rickle et al. advises that stable thermal conductivities are not achieved unless aluminium foil facings are applied. In FIG. 6 Rickle et al.

shows the effect of time upon an unfaced 1 inch thick sample of phenolic foam for an 8 year period. The k factor (thermal conductivity) drifts upwards with time as "air diffuses into the cells" and Rickle et al. suggests using aluminium foils as facings on the foam to prevent such air ingression.

However, a downside to employing unperforated aluminium foil facers is the inability to vent water vapour during processing and cure. Consequently, perforated aluminium facings are now employed to facilitate venting of water vapour and to avoid unsightly blisters occurring in the facings of phenolic foam products. However, the presence of perforations also implies that air can ingress into the foam through the perforations, which can lead to an increase in thermal conductivity as the foam ages and air replaces blowing agent in the foam.

U.S. Pat. No. 4,444,912 is concerned with providing closed-cell phenolic foam having a uniform cell structure in which the cell walls are substantially free of both ruptures and perforations. US'912 describes the impact that water may have on cellular structure during phenolic foam formation. US'912 (paragraph 22) advises that for closed cell foam formation, a phenolic resole foamable composition should contain from 5 to 20 weight percent water based on the total weight of the composition. US'912 also advises that the weight average molecular weight of the phenolic resin should be between about 950 and 1500 and the number average molecular weight should be between about 400 and about 600. The foams described in US'912 are of higher density (>50 $kg/m^3$) than those which are currently used in most building insulation applications. The lower the foam density, the higher the blowing agent content in the foam, and consequently the bigger the impact the blowing agent can have on the thermal conductivity of the foam. However, the lower the foam density the greater is the risk of cellular defects occurring, which could lead to an unwanted increase in thermal conductivity due to loss of blowing agent from the cells.

US'912 also employs CFC blowing agents and the foams described therein have low initial and aged thermal conductivity. US'912 also suggests using dimethyl isophthalate as a foam plasticiser at 0.5 to 5 parts by weight of resin, presumably to also aid foam processing viscosity.

Hydrocarbons have evolved as replacement blowing agents for fluorinated blowing agents such as CFCs and HCFCs. However, employing hydrocarbons such as pentane (and isomers thereof) as "drop in" replacement blowing agents for such fluorinated blowing agents, in foamable resole resin compositions with high water content actually results in a foam having a significantly higher thermal conductivity. It is thought that non-polar hydrocarbon blowing agents diffuse out of foam cells leading to an undesirable increase in thermal conductivity, as air ingresses into the cells of the foam.

International Patent Application Publication No. WO2006114777 describes how a potential cause of degradation of thermal insulation performance in phenolic foam is a reduction in the flexibility of the cell walls of a phenolic foam over time, and describes how plasticisers may be employed to increase the flexibility of the cells walls, thereby stabilising the thermal conductivity of the phenolic foam over an extended period of time. WO'777 describes types of polyester polyol plasticisers which may be used to achieve this goal. The polyester polyol plasticiser is utilised to manufacture phenolic foams by incorporating the plasticiser into a phenolic resin composition and using pentane as a blowing agent; said foams were found to have excellent thermal insulation performance and long term thermal stability.

International Patent Application Publication No. WO2007029222 describes the manufacture of phenolic foam using phenolic resin foamable compositions in Examples 1, 2 and 3 having an overall water content of around 8 to 9 wt % based on the total weight of the phenolic resin foamable composition, with a hydrocarbon blowing agent, in the presence of polyester polyol plasticiser and a castor oil-ethylene oxide adduct surfactant. The plasticiser only slightly reduces the viscosity of the foamable composition. Its presence makes the cell walls of the foam more flexible. The foams described therein have low initial and aged thermal conductivity values.

European Patent No. 1095970 advocates using low water content phenolic resins (less than 8 wt %), to make stable low thermal conductivity foams blown with hydrocarbon blowing agents. An exemplified phenolic resole resin has a water content of approximately 6 wt % and the viscosity of the resin is 5100 mPa·s at 40° C. The viscosity of such a resin if measured at 25° C. would likely be in excess of 25,000 mPa·s. Reducing the water content of the phenolic resin to below about 8 wt % substantially increases the viscosity of the phenolic resin. In order to convey such a phenolic resin through factory conduits, the resin must be heated, leading to an increase in manufacturing costs and a decrease in the shelf-life of the resin. In order to further decrease the viscosity of the resulting foamable composition, diethylene glycol is incorporated into the acid component of the foamable mixture, though this does not obviate the necessity for heating the phenolic resin. The phenolic foams described therein are reported as having low initial and aged thermal conductivity values.

International Patent Application Publication No. WO9708230 also employs low water content phenolic resins, (4 wt % to 8 wt % water content), with organic diluents such as diethylene glycol, and the foams described therein are reported as having low initial and aged thermal conductivity values when blown with n-pentane.

The English language abstract of Japanese Patent Publication No. JP2011219621 asserts that the application is concerned with providing an expandable resin composition capable of giving a foam having a high closed cell ratio and good thermal insulation performance. The expandable resin composition comprises a thermosetting resin, a curing agent, a foaming agent, a silicone surfactant and a glycol compound. JP'621 is predominantly concerned with forming foams using a furan resin. The foams of JP'621 are high density foams, for example Table 1 discloses a foam having a density of 380 $kg/m^3$. In addition, the highest exemplified closed cell content is 74.1%. Rather than being thermal insulating foams, such foams are more correctly characterised as partially closed cell, structural foams. Moreover, furan foams such as those disclosed in JP'621 are brittle, particularly at lower densities.

Notwithstanding the state of the art it would be desirable to have alternative low viscosity phenolic resin systems which are easy to mix and process, which may be used to form closed cell phenolic foam using hydrocarbon blowing agents and for said foam to have excellent initial and aged thermal conductivity. These requirements are solved by the present invention.

SUMMARY OF THE INVENTION

In one aspect, the present invention provides a phenolic foam formed by foaming and curing a phenolic resin foamable composition that comprises a phenolic resin, a surfactant, an acid catalyst, a blowing agent comprising a hydrocarbon having 6 carbon atoms or less, and an alkoxy alcohol having the formula:

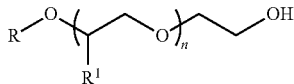

wherein n is 0 to 4, and wherein R is a $C_1$ to $C_6$ aliphatic chain, $R^1$ is H or alkyl, wherein said foam has a closed cell content of 85% or more, and a density of from 10 kg/m³ or more and 100 kg/m³ or less.

Advantageously, the phenolic foam of the present invention has excellent initial and long term thermal conductivity.

Suitably, the phenolic resin has a water content in the range of from 8 wt % to 16 wt %. Preferably, the water content is in the range of from 8 wt % to 14 wt %, such as from 10 wt % to 13 wt %.

Preferably, the phenolic resin foamable composition has a water content in the range of from 7.5 to 14 wt %, such as from 8 to 11 wt % based on the total weight of the phenolic resin foamable composition.

Suitably, the phenolic resin including a surfactant, and the alkoxy alcohol as described herein may have a viscosity in the range of from about 2500 to about 7000 mPa·s at 25° C., for example in the range 4,000 to 6,000 mPa·s at 25° C. This simplifies manufacture of the foam as the phenolic resin composition may be easily pumped at room temperature, in foam manufacture to a continuous foam laminator, through conduits and through a mixing head.

n may be 0, 1 or 2. Suitably, n is 0 or 1.

$R^1$ may be H or $C_1$ to $C_6$ alkyl, such as methyl, ethyl, propyl, butyl, pentyl or hexyl or isomers thereof.

Preferably, $R^1$ is H.

R may be methyl, ethyl, propyl, butyl, pentyl, hexyl or isomers thereof. Suitably, R is methyl, ethyl, propyl or butyl. Preferably, R is butyl.

The alkoxy alcohol may be present in an amount of from 0.5 to 15 parts by weight per 100 parts by weight of phenolic resin. Suitably, the alkoxy alcohol may be present in an amount of from 1 to 12 parts by weight per 100 parts by weight of phenolic resin, for example in an amount of from 1 to 10 parts by weight per 100 parts by weight of phenolic resin.

The hydrocarbon comprising 6 carbons atoms or less may be one or more compounds selected from the group consisting of propane, butane, pentane, hexane and isomers thereof. Suitably, the hydrocarbon comprising 6 carbon atoms or less is one or more compounds selected from the group consisting of n-butane, iso-butane, cyclobutane, n-pentane, iso-pentane and cyclopentane.

The blowing agent may further comprise a halogenated hydrocarbon comprising 6 carbon atoms or less. For example the blowing agent may comprise propyl chloride, dichloroethane, or isomers thereof. Suitably, the halogenated hydrocarbon is isopropyl chloride.

The blowing agent may further comprise a hydrofluoroolefin. Suitably, the hydrofluoroolefin is selected from the group consisting of 1-chloro-3,3,3-trifluoropropene, 1,3,3,3-tetrafluoropropene, 2,3,3,3-tetrafluoropropene and 1,1,1,4,4,4-hexafluoro-2-butene.

The blowing agent may comprise 1 to 20 parts by weight per 100 parts by weight of phenolic resin. Suitably, the blowing agent comprises 5 to 15 parts by weight per 100 parts by weight of the phenolic resin.

The phenolic resin may have a molar ratio of phenol groups to aldehyde groups in the range of from 1:1 to 1:3. The molar ratio of phenol groups to aldehyde groups in the range of from 1.5 to 2.3.

The phenolic resin may have a weight average molecular weight of from 700 to 2000.

The phenolic resin may have a number average molecular weight of from 330 to 800, such as from 350 to 700.

The acid catalyst may be present in an amount of 5 to 25 parts by weight per 100 parts by weight of phenolic resin, preferably the acid catalyst comprises at least one of benzenesulfonic acid, para-toluene sulfonic acid, xylene sulfonic acid, naphthalene sulfonic acid, ethylbenzene sulfonic acid and phenol sulfonic acid. More preferably, the acid catalyst comprises para-toluene sulfonic acid and xylene sulfonic acid.

The phenolic resin may further comprise at least one of a plasticiser, an inorganic filler, a flame retardant, a toughening agent and combinations thereof.

The surfactant may be silicone based or for instance a castor oil-ethylene oxide adduct, suitably, the surfactant is a castor oil-ethylene oxide adduct wherein more than 10 moles but less than 60 moles of ethylene oxide are present per 1 mole of castor oil.

The surfactant may be present in an amount of from 1 to 6 parts by weight per 100 parts by weight of phenolic resin.

The plasticiser may be a polyester polyol that is a reaction product of a polybasic carboxylic acid and a polyhydric alcohol, wherein the polybasic carboxylic acid is a dibasic carboxylic acid, a tribasic carboxylic acid, a tetrabasic carboxylic acid or combinations thereof, and the polyhydric alcohol is a dihydric alcohol, a trihydric alcohol, a tetrahydric alcohol, a pentahydric alcohol, or combinations thereof.

The polybasic carboxylic acid used to synthesise the polyester polyol may comprise at least one of phthalic acid, isophthalic acid, terephthalic acid, naphthalene-2,3-dicarboxylic acid, naphthalene-1,4-dicarboxylic acid, napththa-lene-2,6-dicarboxylic acid, adipic acid, pimelic acid, suberic acid, azelaic acid, sebacic acid, cyclohexane-1,2-dicarboxylic acid, cyclohexane-1,3-dicarboxylic acid, and cyclohexane-1,4-dicarboxylic acid, preferably the polybasic carboxylic acid used to synthesise the polyester polyol comprises one or more of phthalic acid, isophthalic acid, or terephthalic acid.

The polyhydric alcohol used to synthesise the polyester polyol may comprise at least one of ethylene glycol, diethylene glycol, propylene glycol, dipropylene glycol, 1,4-butanediol, 1,5-pentanediol, 1,6-hexanediol, neopentyl glycol, 1,2-cyclohexane dimethanol, 1,3-cyclohexane dimethanol, and 1,4-cyclohexane dimethanol, preferably the polyhydric alcohol used to synthesise the polyester polyol comprises one or more of diethylene glycol, propylene glycol, dipropylene glycol and 1,4-butanediol.

The plasticiser may be present in an amount of from 0.1 to 10 parts by weight per 100 parts by weight of phenolic resin, preferably, plasticiser is present in an amount of 5 parts by weight per 100 parts by weight of phenolic resin.

The inorganic filler may comprise a metal hydroxide or metal carbonate with an ionic equilibrium solubility (Ksp) less than $10^{-8}$ when measured at 25° C. Suitably, the metal carbonate is calcium carbonate. More suitably, the calcium carbonate has an average particle size of 100-300 μm, preferably 150-250 μm.

The phenolic foam may have a pH of 4 or more.

The flame retardant may be selected from the group selected from: organophosphorus compounds, and inorganic phosphorus compounds, such as triethyl phosphate, diphenyl phosphite, diethyl ethyl phosphonate, ammonium polyphosphate, and red phosphorus, or aluminium trihydrate, zinc borate or halogenated flame retardants.

The toughening agent may be selected from the group consisting of urea, dicyandiamide and melamine.

The toughening agent may be present in an amount of from 1 to 10 parts by weight per 100 parts by weight of the phenolic resin.

Preferably, the toughening agent is urea and is present in about 5 parts by weight per 100 parts by weight of the phenolic resin.

The phenolic foam may have a facing on at least one surface thereof, preferably the facing comprises at least one of glass fibre-non woven fabric, spun bonded-non woven fabric, aluminium foil, bonded-non woven fabric, metal sheet, metal foil, ply wood, calcium silicate-board, plaster board, Kraft or other paper product, and wooden board.

At least one facing may be perforated. The facing may be coated with or impregnated with a formaldehyde scavenger and/or flame retardant.

The facing may be impregnated with urea, sodium sulfite, carbohydrazide, aminoguanidine bicarbonate, arginine, oxalyldihydrazide, or adipic acid dihydrazide.

The phenolic foam may have a density of from 10 to 60 kg/m³, suitably, the phenolic foam has a density of from 20 to 45 kg/m³.

The phenolic foam may have a compressive strength of from 80 kPa to 220 kPa, such as from 90 kPa to 180 kPa.

Suitably, the phenolic foam has an aged thermal conductivity 0.025 W/m·K or less, such as 0.022 W/m·K or less, or 0.020 W/m K or less, or 0.018 W/m·K or less, or 0.016 W/m·K or less, when measured at a mean temperature of 10° C. after heat ageing for 175±5 days at 70±2° C., in accordance with the procedure specified in European Standard BS EN 13166:2012. For example, the phenolic foam may have an aged thermal conductivity in the range of from 0.025 W/m·K to 0.016 W/m·K, such as from 0.025 W/m·K to 0.017 W/m·K.

In a preferred embodiment, the phenolic foam of the present invention is formed by foaming and curing a phenolic resin foamable composition that comprises a phenolic resin, a surfactant, an acid catalyst, a blowing agent comprising a hydrocarbon having 6 carbon atoms or less, and an alkoxy alcohol having the formula:

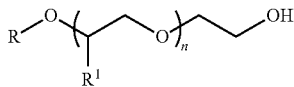

wherein n is 0 to 4, and wherein R is a $C_1$ to $C_6$ aliphatic chain, $R^1$ is H or alkyl, wherein the surfactant is present in an amount of from 1 to 6 parts by weight per 100 parts by weight of phenolic resin;

wherein the water content of the phenolic resin foamable composition is in the range of from 7.5 wt % to 14 wt % based on the total weight of the phenolic resin foamable composition, wherein the alkoxy alcohol is present in an amount of from 0.5 to 12.5 parts by weight per 100 parts by weight of the phenolic resin, wherein the blowing agent is present in an amount of from 5 to 15 parts by weight per 100 parts by weight of the phenolic resin, wherein the acid catalyst is present in an amount of 5 to 25 parts by weight of the phenolic resin, wherein the hydrocarbon comprising 6 carbon atoms or less is one or more compounds selected from the group consisting of n-butane, isobutane, cyclobutane, n-pentane, isopentane, cyclopentane and cyclohexane, preferably where said hydrocarbon comprises pentane or an isomer thereof, wherein the phenolic resin has a molar ratio of phenol groups to aldehyde groups in the range of from 1:1 to 1:3;

wherein the phenolic resin including surfactant, and the alkoxy alcohol have a viscosity of from about 2500 to about 7000 mPa·s at 25° C., such as from about 4,000 to about 6,000 mPa·s at 25° C.;

wherein said foam has a closed cell content of 90% or more, a density of from 10 kg/m³ or more and 60 kg/m³ or less; and wherein said foam has a thermal conductivity after ageing at 110° C. for 14 days of 0.025 W/m·K or less in accordance with BS EN13166:2012.

DETAILED DESCRIPTION

The manufacture of phenolic resin foams involves foaming and curing a phenolic resin composition comprising a phenolic resin, a surfactant and a blowing agent in the presence of an acid catalyst. In a factory setting, phenolic foam is often manufactured using a heated continuous foam laminator. A phenolic resin composition comprising phenolic resin with surfactant premixed in, and a blowing agent may be pumped to a mixing head where it is mixed with acid catalyst to form a foamable composition which is immediately deposited on to a suitable carrier facing. An exotherm is generated upon the addition of the acid catalyst to the phenolic resin composition and foam formation commences. The foaming composition is conveyed to a heated continuous foam laminator, where the composition is heated and cured. Curing leads to cross-linking of the phenolic resin. Controlling the exotherm is essential to ensure the formation of a phenolic foam having a high closed cell content and stable low thermal conductivity. While high water content can act as a heat sink for the exotherm, a downside of having a phenolic resin composition having high water content can be greater open cell content due to rupture of cells by water vapour generation.

The water content of the resin has a significant impact on the viscosity of the foamable composition and on the thermal conductivity of foams made therewith. While foams having stable long term thermal conductivity values may be formed using phenolic resin having low water content i.e. less than 8 wt % based on the total weight of the resin, such phenolic resins are very viscous at 25° C. and in order to facilitate pumping of such resins around a factory, the resin must be heated. This increases manufacturing costs and also decreases the shelf-life of resin. While using higher water content resins increases the ease of conveying the materials through conduits and manifolds around a factory, increasing water content of a phenolic resin can have a deleterious impact on the thermal conductivity of foam formed from phenolic resin foamable compositions comprising high water content phenolic resins. There is increased difficulty in forming closed cell foams using such high water content resins.

The materials used to form phenolic foams vary in their hydrophilicity and miscibility. Hydrocarbon blowing agents for example are hydrophobic, whereas the acid catalysts may be hydrophilic and both acids and resins may have varying water contents. The present inventors conducted an extensive screening program to identify a diluent which would decrease the viscosity of a phenolic resole resin having a water content in the range of from 8 wt % to 16 wt %, thereby enabling phenolic resin foam formation using a phenolic resin foamable composition having a water content of from around 7.5 wt % to 14 wt %, with said phenolic resin foam having excellent long term thermal stability and low thermal conductivity despite using a hydrocarbon blowing agent such as propane, butane, pentane or hexane. Such hydrocarbon blowing agents have considerably different hydrophilicities to traditional blowing agents such as CFCs, HCFCs and HFCs. While CFCs such as Freon 11 and Freon 113, are effective blowing agents in high water content phenolic resin compositions such as those described in EP'357, when such blowing agents are replaced with hydrophobic hydrocarbon blowing agents, this necessitates the reduction of water content in the phenolic resin, raising resin viscosity considerably, to manufacture phenolic foams having stable thermal insulation performance.

The present inventors posited that an organic diluent capable of increasing the miscibility of phenolic resole resins having high water content of around 8 to 16 wt % and containing a surfactant, with a hydrocarbon blowing agent and an acid catalyst may facilitate the formation of phenolic resin foams having excellent thermal conductivity and excellent long term thermal insulation performance. The organic diluent would also substantially lower the viscosity of a foamable composition formed therewith. A plethora of organic compounds was assessed for miscibility with blowing agents and acid catalysts.

Miscibility Studies

Various organic liquids (diluents) were added to cyclopentane to determine miscibility therewith. To the mixture of cyclopentane and diluent was added liquid aryl sulfonic acid and the effect on the resulting mixture was observed.

Table 1 provides details for miscibility studies with a variety of liquid organic diluents.

It was considered that the formation of a homogenous solution i.e. no separation of layers, (only one chemical layer of the mixture), would indicate compatibility between cyclopentane and the selected organic diluent. To the cyclopentane-diluent mixture, was then added a blend of toluene sulfonic acid/xylene sulfonic acid 65/35 weight ratio and the resulting mixture was stirred for 5 minutes. The extent of separation of cyclopentane, diluent and acid was observed and is shown in Column 4 of Table 1 below.

Of the diluents tested, only ethylene glycol monobutyl ether, diethylene glycol monobutyl ether, and 2-ethoxyethanol formed a homogenous single layer solution when mixed with 10 g of cyclopentane and 20 g of the aryl sulfonic acid blend.

TABLE 1

| Mix Number | Organic Diluent 10 g | Effect of adding 10 g cyclopentane | Effect of adding 20 g of toluene/xylene sulfonic acid (TX Acid) |
|---|---|---|---|
| 1 | None | Not applicable | 2 separate layers |
| 2 | Monoethylene glycol (MEG) | 2 separate layers | 2 separate layers |
| 3 | Diethylene glycol (DEG) | 2 separate layers | 2 separate layers |
| 4 | Propane-1,2,3-triol | 2 separate layers | 2 separate layers |
| 5 | Dipropylene glycol | 2 separate layers | 2 separate layers |
| 6 | 1,4 butane diol | 2 separate layers | 2 separate layers |
| 7 | Eugenol (4-allyl-2-methoxy phenol) | 1 layer | 2 separate layers |
| 8 | 1,3-dioxolane | 1 layer | 2 separate layers |
| 9 | Ethylene glycol monobutyl ether | 1 layer | 1 layer (No separation) |
| 10 | Diethylene glycol monobutyl ether | 1 layer | 1 layer (No separation) |
| 11 | 2 ethoxy ethanol | 1 layer | 1 layer (No separation) |
| 12 | Coconut oil | 1 layer | Minor separation out, $2^{nd}$ layer just visible Opaque |
| 13 | Oleic acid | 1 layer | Minor separation out, $2^{nd}$ layer just visible Opaque |
| 14 | *TOFA Resoline BD30 | 1 layer | 2 layers |
| 15 | *TOFA Resoline BD2 | 1 layer | Minor separation out, $2^{nd}$ layer just visible Opaque |
| 16 | Olive Oil | 1 layer | Minor separation out, $2^{nd}$ layer just visible Opaque |

*Tall oil fatty acids (TOFA). TOFA comprises oleic, linoleic, palmitic, stearic and linolenic acids).

Similar miscibility studies were conducted using n-pentane, see Table 2.

TABLE 2

| Mix Number | Organic Diluent 10 g | Effect of adding 10 g n-pentane | Effect of adding 20 g of toluene/xylene sulfonic acid (TX Acid) |
|---|---|---|---|
| 1 | None | Not applicable | 2 separate layers |
| 2 | Monoethylene glycol (MEG) | 2 separate layers | 2 separate layers |
| 3 | Diethylene glycol (DEG) | 2 separate layers | 2 separate layers |
| 4 | Propane-1,2,3-triol | 2 separate layers | 2 separate layers |
| 5 | Dipropylene glycol | 2 separate layers | 2 separate layers |
| 6 | 1,4 butane diol | 2 separate layers | 2 separate layers |
| 7 | Eugenol (4-allyl-2-methoxy phenol) | 1 layer | 2 separate layers |

TABLE 2-continued

| Mix Number | Organic Diluent 10 g | Effect of adding 10 g n-pentane | Effect of adding 20 g of toluene/xylene sulfonic acid (TX Acid) |
|---|---|---|---|
| 8 | 1,3-dioxolane | 1 layer | 2 separate layers |
| 9 | Ethylene glycol monobutyl ether | 1 layer | 1 layer |
| 10 | Diethylene glycol monobutyl ether | 1 layer | 1 layer |
| 11 | 2 ethoxy ethanol | 1 layer | 1 layer |
| 12 | Coconut oil | 1 layer | 2 separate layers, Opaque |
| 13 | Oleic acid | 1 layer | 2 separate layers, Opaque |
| 14 | *TOFA Resoline BD30 | 1 layer | 2 separate layers, Opaque |
| 15 | *TOFA Resoline BD2 | 1 layer | 2 separate layers, Opaque |
| 16 | Olive Oil | 1 layer | 2 separate layers, Opaque |

*Tall oil fatty acids (TOFA). TOFA comprises oleic, linoleic, palmitic, stearic and linolenic acids).

It was considered that no separation (only one layer) would indicate compatibility between the organic diluent, n-pentane and the blend of aryl sulfonic acids. Only the alkoxy alcohols in rows 9 to 11 formed single layer solutions when mixed with n-pentane and the blend of aryl sulfonic acids in the specified amounts.

Miscibility of the alkoxy alcohol diluents from rows 9 to 11 of Tables 1 and 2, with phenolic resin was also investigated, and surprisingly, when mixed with a phenolic resole resin having a water content of approximately 12 to 13 wt % a single layer solution was formed.

The alkoxy alcohols demonstrate good miscibility with water, phenolic resin, hydrocarbons such as pentane, and aryl sulfonic acids. Accordingly, the ability to form phenolic foams using alkoxy alcohols as diluents, and the properties of such foams were investigated.

Suitable testing methods for measuring the physical properties of phenolic foam are described below.

(i) Foam Density:

This was measured according to BS EN 1602:2013—Thermal insulating products for building applications—Determination of the apparent density.

(ii) Thermal Conductivity:

A foam test piece of length 300 mm and width 300 mm was placed between a high temperature plate at 20° C. and a low temperature plate at 0° C. in a thermal conductivity test instrument (LaserComp Type FOX314/ASF, Inventech Benelux BV). The thermal conductivity (TC) of the test pieces was measured according to EN 12667: "Thermal performance of building materials and products—Determination of thermal resistance by means of guarded hot plate and heat flow meter methods, Products of high and medium thermal resistance".

(iii) Thermal Conductivity after Accelerated Ageing:

This was measured using European Standard BS EN 13166:2012—"Thermal insulation products for buildings—Factory made products of phenolic foam (PF)". The thermal conductivity is measured after exposing foam samples for 25 weeks at 70° C. and stabilisation to constant weight at 23° C. and 50% relative humidity. This thermal ageing serves to provide an estimated thermal conductivity for a time period of 25 years at ambient temperature. Alternatively samples may be heat aged for 14 days at 110° C. Details for thermal ageing and determination of thermal conductivity are specified in Annex C section C.4.2. The mean plate temperature was 10° C.

(iv) pH:

The pH was determined according to the standard BS EN 13468.

(v) Closed-Cell Ratio:

The closed-cell ratio was determined according to ASTM D6226 test method.

(vi) Compressive Strength:

The compressive strength was measured according to test method EN 826

(vi) Viscosity:

The viscosity was measured using a Brookfield viscometer (model DV-II+Pro) with a controlled temperature water bath, maintaining the sample temperature at 25° C., with spindle number S29 rotating at 20 rpm.

The phenolic foam of the present invention is formed by foaming and curing a phenolic resin foamable composition that comprises a phenolic resin, a surfactant, an acid catalyst, a blowing agent comprising a hydrocarbon having 6 carbon atoms or less, and an alkoxy alcohol having the formula:

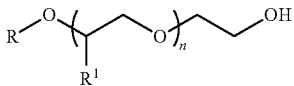

wherein n is 0 to 4, and wherein R is a $C_1$ to $C_6$ aliphatic chain, $R^1$ is H or alkyl. R may be methyl, ethyl, propyl, butyl or isomers thereof; preferably, R is butyl, e.g. n-butyl. When $R^1$ is alkyl, $R^1$ may be methyl, ethyl, propyl, butyl, pentyl, hexyl or isomers thereof; preferably, $R^1$ is H or methyl. The phenolic resin and the alkoxy alcohol are combined by mixing. Blowing agent is added to the resulting mixture and acid catalyst is subsequently added with mixing and foaming commences. The resulting foam is then cured under heat and pressure.

Suitably, the alkoxy alcohol is present in an amount of from about 0.5 wt % to about 10 wt % based on the total weight of the phenolic resin foamable composition, for example, the alkoxy alcohol may be present in an amount of from about 0.5 wt % to about 8 wt % based on the total weight of the phenolic resin foamable composition.

The phenolic foam of the invention has a closed cell content of 85% or more. Preferably, the phenolic foam has a closed cell content of 90% or more, more preferably, the phenolic foam has a closed cell content of 95% or more, such as 98% or more.

The phenolic foam has a density of from 10 kg/m³ to 100 kg/m³. Suitably, the foam has a density of from 10 kg/m³ to 60 kg/m³, preferably from 20 kg/m³ to 45 kg/m³.

The alkoxy alcohol has the formula:

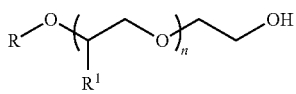

wherein n is 0 to 4, and wherein R is a $C_1$ to $C_6$ aliphatic chain, $R^1$ is H or methyl.

For example, the alkoxy alcohol may be selected from the group consisting of ethylene glycol monomethyl ether, ethylene glycol monoethyl ether, ethylene glycol monopropyl ether, ethylene glycol monobutyl ether, ethylene glycol monopentyl ether, ethylene glycol monohexyl ether, diethylene glycol monomethyl ether, diethylene glycol monoethyl ether, diethylene glycol monopropyl ether, diethylene glycol monobutyl ether diethylene glycol monopentyl ether, diethylene glycol monohexyl ether triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, propylene glycol monomethyl ether, propylene glycol monoethyl ether, propylene glycol monopropyl ether, propylene glycol monobutyl ether, propylene glycol monopentyl ether, propylene glycol monohexyl ether, dipropylene glycol monomethyl ether, dipropylene glycol monoethyl ether, dipropylene glycol monopropyl ether, dipropylene glycol monobutyl ether, dipropylene glycol monopentyl ether, dipropylene glycol monohexyl ether tripropylene glycol monomethyl ether, tripropylene glycol monoethyl ether, tripropylene glycol monopropyl ether, tripropylene glycol monobutyl ether, tripropylene glycol monopentyl ether and propylene glycol monohexyl ether.

Preferably, the alkoxy alcohol is selected from the group consisting of ethylene glycol monoethyl ether, ethylene glycol monobutyl ether, and diethylene glycol monobutyl ether.

EXAMPLES

The phenolic resins used in the invention are phenolic resole Resins A and B and are described as follows.

Example (1)—"Resin A" Preparation

On a weight basis, Resin A was prepared by mixing under reflux 50.7 parts of phenol, 2.7 parts of water and 0.94 parts of 50% potassium hydroxide at 20° C. The temperature was raised to 74 to 76° C. under reflux and 35.5 parts of 91% paraformaldehyde was added over 2 hours. The temperature was then raised to 82 to 85° C. and the temperature was maintained there until the viscosity of the resin reached was 6500 mPa·s. Cooling was commenced whilst adding 0.3 parts of 90% formic acid. Below 50° C. the following were sequentially added: 4.5 parts of urea and 3.2 parts of ethoxylated castor oil (surfactant). The resulting phenolic resin composition (Resin A) contained 12.6% water, below 4% free phenol, and less than 1% free formaldehyde. The viscosity of the phenolic resin composition was 7000 to 14000 mPa·s at 25° C.

Example (2)—"Resin B"

Resin B is a resole resin; more specifically Resin B is a liquid phenol-urea-formaldehyde resin. Resin B is commercially available from Hexion UK under the trade name "IDP445". This resin has a viscosity of 7,000-11,000 mPa·s at 25° C., pH 7.5 to 8.0.

Resin B resin contained from 3 wt % to 4 wt % free phenol and below 0.5 wt % free formaldehyde. Water content was 10 to 11 wt %, (measured by Karl-Fisher analysis). Resin B contained 2 to 4% surfactant as described previously herein.

Blowing agent blends used in the examples and comparative examples are described in Table 3.

TABLE 3

| Blowing Agent | Composition (wt ratio) |
| --- | --- |
| D | Cyclopentane/isopentane (85:15) |
| E | n-pentane/isopentane (85:15) |
| F | Perfluoropentane ($C_5F_{12}$) |
| G | D/F (95:5) |
| H | E/F (95:5) |

TX acid catalyst is a toluene sulphonic acid/xylene sulphonic acid blend (65%/35% by weight).

The following Examples and Comparative examples show how foam samples of the invention are made.

Example (3)—Phenolic Foam Preparation Containing 2-Ethoxy Ethanol as the Alkoxy Alcohol Phenolic resin compositions having various amounts of 2-ethoxy ethanol were prepared according to the formulations specified in Table 4. Foams were formed using said phenolic resin compositions and the density, initial thermal conductivity and aged thermal conductivity of the foams were measured.

To 111.3 parts by weight of "Resin A" at 11-15° C. was added with mixing 2-ethoxy ethanol, in the amounts specified in Table 4 below. Next, 8.5 parts by weight of Blowing Agent D at 1 to 3° C. were mixed into the resin mixture. The resin mixture was cooled to between 2° C. and 8° C. Next, 21 parts by weight of TX acid at 8° C. were quickly mixed into the resin mixture. High speed mixing at 1000 to 3000 rpm was used. 295±10 g of the resulting formulated resin composition was transferred into a closed picture frame mould of dimensions 400 mm×350 mm×50 mm at 70° C. for 10 minutes to form a 50 mm thick rigid phenolic foam. The base plate had a polythene sheet that could easily be removed from the cured foam or a suitable facing such as a glass fibre mat was applied. Similarly a top sheet of polythene sheet or glass mat facing was placed on top of the rising phenolic foam.

A pressure of 15 kPa is applied to the lid of the mould to pressurise the rising foam. The foam sample is then removed from the mould and post-cured in an oven for 16 hours at 70° C. to 75° C. The foam boards produced have a dry cured density of approximately 41 kg/m³.

Drift upwards in aged thermal conductivity (A) is significantly reduced for foams containing 2-ethoxy ethanol.

Excellent aged thermal conductivity is achieved when from about 0.5 to 12.5 parts by weight of alkoxy alcohol was added per 100 parts by weight of phenolic resin as shown in Table 4. The addition of 2-ethoxyethanol also improves initial thermal conductivity relative to the foam without 2-ethoxy ethanol.

TABLE 4

| Sample reference | Control | 1 | 2 | 3 | 4 | 5 | 6 | 7 |
|---|---|---|---|---|---|---|---|---|
| | | | | pbw | | | | |
| Resin A. | 111.3 | 111.3 | 111.3 | 111.3 | 111.3 | 111.3 | 111.3 | 111.3 |
| 2-ethoxy ethanol | 0 | 1 | 2.5 | 5 | 7.5 | 10 | 12.5 | 15 |
| Blowing Agent D | 8.5 | 8.5 | 8.5 | 8.5 | 8.5 | 8.5 | 8.5 | 8.5 |
| TX Acid | 21 | 21 | 21 | 21 | 21 | 21 | 21 | 21 |
| Total % Water Content of the foamable chemical mixture | 9.96 | 9.89 | 9.78 | 9.62 | 9.45 | 9.29 | 9.15 | 9.00 |
| | | | | Properties | | | | |
| Initial Thermal Conductivity (mW/m · K) | 25.08 | 24.61 | 24.02 | 23.23 | 22.82 | 22.15 | 20.84 | 23.01 |
| Aged Thermal Conductivity Lambda after 14 days at 110° C. (mW/m · K) | 28.77 | 22.98 | 22.98 | 24.48 | 23.2 | 23.66 | 25.18 | 25.76 |
| Dry Foam Density (kg/m³) after 4 days at 70° C. | 41 | 41.7 | 41.8 | 41.3 | 41.4 | 41.4 | 41.7 | 41.7 |

Example (4)—Phenolic Foam Preparation Containing Butyl Diglycol as the Alkoxy Alcohol Phenolic resin foamable compositions containing butyl diglycol were prepared according to the formulations specified in Table 5. Foams were formed using said phenolic resin foamable compositions and the initial thermal conductivity and aged thermal conductivity of the foams were measured.

To 110.5 parts by weight of the specified resin at 11-15° C. was added with mixing 6 parts by weight of butyl diglycol. Next, 8 to 10 parts by weight of 100% isopentane was added at 1 to 3° C. with mixing. The resin mixture was cooled to between 0° C. and 3° C. Next, 18 to 21.5 parts by weight of TX acid at 8° C. were quickly mixed into the resin mixture. High speed mixing at 2000 to 3000 rpm was used. Approximately 75 g of the resulting formulated resin composition was transferred into a closed picture frame mould of dimensions 280 mm×235 mm×25 mm at 70° C. for 10 to 15 minutes to form a 25 mm thick rigid phenolic foam. The base plates of the mould had either a polythene sheet that could easily be removed from the cured foam or have suitable facings such as a glass fibre mat.

A pressure of 15 kPa was applied to the lid of the mould to pressurise the rising foam. The foam sample was then removed from the mould and post-cured in an oven for 16 hours at 70° C. to 75° C. The foam boards produced had dry cured density values of around 45 kg/m³.

Drift upwards in aged thermal conductivity (λ) is significantly reduced for foams containing butyl diglycol.

TABLE 5

| Sample reference | Control | 8 | 9 | 10 |
|---|---|---|---|---|
| | | pbw | | |
| Resin A. | 110.5 | 110 | 0 | 0 |
| Resin B | 0 | 0 | 110 | 110 |
| Butyl Diglycol | 0 | 6 | 6 | 6 |
| Isopentane | 10 | 8 | 8 | 6 |
| TX Acid | 18 | 21.4 | 21.4 | 20 |
| Total % water content of the foamable chemical mixture | 10.00 | 9.53 | 7.94 | 8.13 |
| | | Properties | | |
| Initial Thermal Conductivity (mW/m · K), mean plate temperature of 10° C. | 29.64 | 20.9 | 21.2 | 20.6. |
| Aged Thermal Conductivity after 14 days at 110° C. (mW/m · K), mean plate temperature of 10° C. | >30 | 22.9 | 22.1 | 22.9 |
| Dry Foam Density (kg/m³) after 4 days at 70° C. | 45 | 45 | 45 | 45 |

COMPARATIVE FOAM EXAMPLES

Comparative Example 1— Ethylene Glycol Diluent

Foam samples were prepared in the same way as described in Example 3, replacing the alkoxy alcohol with mono-ethylene glycol as the organic diluent. Table 6 below shows that all thermally aged thermal conductivity values exceed 25 mW/m·K and even initial thermal conductivity values were generally high.

TABLE 6

| Sample reference | Control | 11 | 12 | 13 | 14 |
|---|---|---|---|---|---|
| | | | Pbw | | |
| Resin A. | 111.3 | 111 | 111 | 111 | 111 |
| Mono-ethylene glycol | 0 | 2.5 | 5 | 7.5 | 10 |
| Blowing Agent D | 8.5 | 8.5 | 8.5 | 8.5 | 8.5 |
| TX Acid | 21 | 21 | 21 | 21 | 21 |
| | | Properties | | | |
| Initial Thermal Conductivity (mW/m · K), mean plate temperature of 10° C. | 28.66 | 25.21 | 25.63 | 23.73 | 24.67 |
| Aged Thermal Conductivity Lambda after 14 days at 110° C. (mW/m · K), mean plate temperature of 10° C. | 29.47 | 27.04 | 28.43 | 27.68 | 28.67 |
| Dry Foam Density (kg/m³) after 4 days at 70° C. | 41 | 41.7 | 41.8 | 41.3 | 41.4 |

Low viscosity fatty acid compounds such as oleic acid, olive oil, coconut oil and TOFA Resoline BD2 demonstrate complete miscibility when they are individually blended with a hydrocarbon such as cyclopentane or n-pentane, (a single layer homogeneous solution is formed).

When such a miscible solution of hydrocarbon and fatty acid compound is mixed with an aryl sulfonic acid, such as "Acid TX", separation into 2 layers is observed on standing.

The efficacy of fatty acid additives as diluents was further investigated to determine whether or not in foam formation, such additives would assist in obtaining low aged thermal conductivity for phenolic foams blown with either cyclopentane or n-pentane isomers.

Comparative Example 2—Oleic Acid Diluent

Foam samples were prepared in the same way as specified in Example 3 using either blowing agent D or blowing agent E and employing 2-3 parts by weight of 95% oleic acid instead of the alkoxy alcohol. The resulting foams had initial thermal conductivity values of approximately 25 mW/m·K however, the thermal conductivity values significantly exceeded 25 mW/m·K at 10° C. mean plate temperature after the foams were aged at 70° C.

These thermal conductivity results show thermal conductivity drifts upwards on ageing when oleic acid was employed as an additive.

Comparative Example 3—Fatty Acid Additives

It is generally known that the addition of perfluoroalkanes to hydrocarbon blowing agents results in a finer cell phenolic foam. It was considered whether or not forming foams having finer cells would aid aged thermal conductivity performance with fatty acids as additives.

Comparative Example 3 below repeats Comparative Example 2 but with a perfluoroalkane as a co-blowing agent to the pentane blowing agents. In addition, the efficacy of other fatty acid organic diluents from Table 2 was investigated.

To 111 parts by weight of Resin "A" at 11-15° C. was mixed 2.25 parts by weight of a fatty acid compound as provided in Table 2. Next, 10 to 11 parts by weight of the specified blowing agent at 1° C. to 3° C. was mixed into the resin. The mixture was cooled to between 3° C. and 8° C. Next, 18 to 20 parts by weight of acid at 8° C. was quickly mixed into the resin mixture. High speed mixing, up to 3000 rpm was used. 110±10 g of the resulting resin emulsion was transferred into a picture-frame mould of dimensions 300 mm×300 mm×25 mm at 70° C. for 20 minutes to form a 25 mm thick rigid phenolic foam. The base plate had a polythene sheet that could easily be removed from the cured foam. Similarly a top sheet of polythene sheet was placed on top of the rising foam.

A pressure of 15 kPa was applied to the lid of the mould to pressurise the rising foam. The foam sample was then post-cured in an oven for 12 to 16 hours at 70° C. The foam boards produced had dry cured density values as indicated in Table 7. No facing materials (such as aluminium foil) were present on the surfaces of the foam board sample during thermal ageing.

Table 7 below summarises thermal conductivity (λ) results for hydrocarbon/perfluoropentane blown phenolic foam modified with fatty acid present.

Whilst drift upwards in aged thermal conductivity (λ) is clearly shown, foams containing fatty acid are marginally better than the control sample containing no fatty acid. However, the useful application requirement of an aged thermal conductivity of below 0.025 W/m·K is not achieved.

TABLE 7

| Blowing Agent | Fatty Acid | Density (kg/m³) | Initial λ (W/m · K), mean plate temperature of 10° C. | 70° C. Aged λ (W/m · K) |
|---|---|---|---|---|
| D + F (Control) | Not Added | 31.6 | 0.0274 | 0.0303 (after 7 days) |
| D + F | Oleic acid | 44 | 0.0212 | 0.0309 (after 5 days) |
| E + F | Oleic acid | 32.3 | 0.0211 | 0.0298 (after 26 days) |
| E + F | Oleic acid | 39.7 | 0.0226 | 0.0284 (after 25 days) |
| E + F | Oleic acid | 35.6 | 0.0242 | 0.0287 (after 5 days) |
| E + F | TOFA BD2 | 47.9 | 0.0267 | 0.0288 (after 5 days) |
| D + F | TOFA BD2 | 38.3 | 0.0299 | 0.0317 (after 5 days) |
| D + F | Olive Oil | 42.6 | n/a | 0.0330 (after 5 days) |
| D + F | Coconut oil | 43.0 | 0.0330 | n/a |
| E + F | Coconut oil | 40.8 | 0.0328 | n/a |

*Tall oil fatty acids (TOFA). TOFA comprises oleic, linoleic, palmitic, stearic and linolenic acids).

Prior art phenolic foams achieved stable low thermal conductivity for phenolic foam by either:
(i) Employing saturated fluorinated blowing agents such as CFCs, HCFCs or HFCs with phenolic resins having water content in the range of 8 to 20 wt % based on the weight of the phenolic resin;
(ii) Employing hydrocarbon blowing agents such as pentane with viscous, phenolic resins having low water content i.e. less than 8 wt % based on the weight of the phenolic resin; or
(iii) Employing hydrocarbon blowing agents such as pentane with phenolic resins having medium to high water content 10 to 16 wt % based on the weight of the phenolic resin, with diluents such as polyester polyols.

The present invention is a next generation approach which employs a liquid organic diluent additive (i.e. liquid at room temperature), specifically an alkoxy alcohol additive as specified herein, which facilitates the formation of phenolic foams having stable low thermal conductivity despite using phenolic resin compositions having medium to high water contents. Advantageously, the incorporation of these alkoxy alcohol additives into phenolic resin decreases the viscosity of the resulting phenolic resin foamable compositions thereby facilitating easy pumping of the resin through conduits, manifolds and mixing heads. The alkoxy alcohol additives have low viscosity values—significantly lower than prior art polyester polyol additives for example, and the viscosity of phenolic resins incorporating said alkoxy alcohol additives is much lower than those comprising prior art additives such as polyester polyols. Table 8 illustrates the viscosity reduction achieved that aids foam processing. Furthermore, foams formed using phenolic resins comprising alkoxy alcohol additives, which are blown with hydrocarbon blowing agents have low thermal conductivity and have stable thermal stability. Advantageously, the foams of the present invention are less brittle than prior art foams.

TABLE 8

| Phenolic Resin Used | Viscosity Without Butyl Diglycol (mPa·s at 25° C.) | Viscosity With 6 parts/100 parts of Butyl Diglycol (mPa·s at 25° C.) |
|---|---|---|
| Resin A | 9450 | 5520 |
| Resin B | 7600 | 4500 |

In preferred embodiments of the invention, the viscosity of the phenolic resin including surfactant, and alkoxy alcohol is in the range of from about 2,500 to 7,000 mPa·s at 25° C. such as from about 4000 to 6000 mPa·s at 25° C.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A phenolic foam formed by foaming and curing a phenolic resin foamable composition that comprises a phenolic resin, a surfactant, an acid catalyst, a blowing agent comprising a hydrocarbon having 6 carbon atoms or less, and an alkoxy alcohol either (a) having the formula:

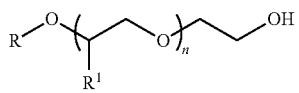

wherein n is 0 to 4, and wherein R is a $C_1$ to $C_6$ aliphatic chain, $R^1$ is H or alkyl, or (b) being selected from the group consisting of:
propylene glycol monomethyl ether, propylene glycol monoethyl ether,
propylene glycol monopropyl ether, propylene glycol monobutyl ether,
propylene glycol monopentyl ether, propylene glycol monohexyl ether,
dipropylene glycol monomethyl ether, dipropylene glycol monoethyl ether,
dipropylene glycol monopropyl ether, dipropylene glycol monobutyl ether,
dipropylene glycol monopentyl ether, dipropylene glycol monohexyl ether
tripropylene glycol monomethyl ether, tripropylene glycol monoethyl ether,
tripropylene glycol monopropyl ether, tripropylene glycol monobutyl ether,
tripropylene glycol monopentyl ether and tripropylene glycol monohexyl ether;
wherein the foam has a closed cell content of 85% or more as determined according to ASTM D6226, and a density of from 10 kg/m³ or more and 100 kg/m³ or less as measured according to BS EN 1602:2013.

2. The phenolic foam as claimed in claim 1, wherein the phenolic resin has a water content in the range of from 7.5 wt % to 16 wt % based on the total weight of the phenolic resin foamable composition.

3. The phenolic foam as claimed in claim 1, wherein n is 0, 1 or 2.

4. The phenolic foam as claimed in claim 1, wherein R1 is H, or C1 to C6 alkyl.

5. The phenolic foam as claimed in claim 1, wherein R is selected from the group comprising methyl, ethyl, propyl, butyl, pentyl, hexyl and isomers thereof.

6. The phenolic foam as claimed in claim 1, wherein the alkoxy alcohol is present in an amount of from 0.5 to 15 parts by weight per 100 parts by weight of phenolic resin.

7. The phenolic foam as claimed in claim 1, wherein the hydrocarbon comprising 6 carbons atoms or less is one or more compounds selected from the group comprising butane, pentane, hexane, n-butane, isobutane, cyclobutane, n-pentane, isopentane, cyclopentane and cyclohexane, and isomers thereof.

8. The phenolic foam as claimed in claim 1, wherein the blowing further comprises a halogenated hydrocarbon comprising 6 carbon atoms or less, a hydrofluoroolefin, or a combination thereof.

9. The phenolic foam as claimed in claim 1, wherein the blowing agent further comprises propyl chloride, dichloroethane, or isomers thereof.

10. The phenolic foam as claimed in claim 1, wherein the blowing agent further comprises a hydrofluoroolefin selected from the group consisting of 1-chloro-3,3,3-trifluoropropene, 1,3,3,3-tetrafluoropropene, 2,3,3,3-tetrafluoropropene and 1,1,1,4,4,4-hexafluoro-2-butene.

11. The phenolic foam as claimed in claim 1, wherein the blowing agent is present in an amount of from 1 to 20 parts by weight per 100 parts by weight of phenolic resin.

12. The phenolic foam as claimed in claim 1, wherein the phenolic resin has a molar ratio of phenol groups to aldehyde groups in the range of from 1:1 to 1:3.

13. The phenolic foam as claimed in claim 1, wherein the phenolic resin has a weight average molecular weight of from 700 to 2000.

14. The phenolic foam as claimed in claim 1, wherein the pH of the foam is 4 or more.

15. The phenolic foam as claimed in claim 1, wherein the density of the foam is of from 10 to 60 kg/m³.

16. The phenolic foam as claimed in claim 1, wherein the phenolic foam has a compressive strength of from 80 kPa to 220 kPa.

17. The phenolic foam as claimed in claim 1, wherein the phenolic foam has an aged thermal conductivity 0.025 W/m·K or less when measured at a mean temperature of 10° C. after heat ageing for 175±5 days at 70±2° C., in accordance with the procedure specified in European Standard BS EN 13166:2012.

18. The phenolic foam as claimed in claim 1, wherein the phenolic foam has an aged thermal conductivity in the range of from 0.025 W/m·K to 0.016 W/m·K when measured at a mean temperature of 10° C. after heat ageing for 175±5 days at 70±2° C., in accordance with the procedure specified in European Standard BS EN 13166:2012.

19. The phenolic foam as claimed in claim 1, wherein the viscosity of the phenolic resin, including the surfactant and alkoxy alcohol is in the range of from 2500 to 7000 mPa·s at 25° C. as measured using a Brookfield viscometer (model DV-II+Pro) with a controlled temperature water bath, maintaining the sample temperature at 25° C., with spindle number S29 rotating at 20 rpm.

20. A method for manufacturing a phenolic foam comprising the steps of:
 foaming and curing a foamable composition comprising:
  a phenolic resin, a surfactant, an acid catalyst, a blowing agent comprising a hydrocarbon having 6 carbon atoms or less, and an alkoxy alcohol either (a) having the formula:

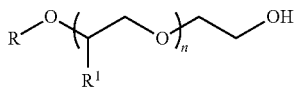

wherein n is 0 to 4, and wherein R is a C1 to C6 aliphatic chain, R1 is H or alkyl, or (b) being selected from the group consisting of:
propylene glycol monomethyl ether, propylene glycol monoethyl ether,
propylene glycol monopropyl ether, propylene glycol monobutyl ether,
propylene glycol monopentyl ether, propylene glycol monohexyl ether,
dipropylene glycol monomethyl ether, dipropylene glycol monoethyl ether,
dipropylene glycol monopropyl ether, dipropylene glycol monobutyl ether,
dipropylene glycol monopentyl ether, dipropylene glycol monohexyl ether
tripropylene glycol monomethyl ether, tripropylene glycol monoethyl ether,
tripropylene glycol monopropyl ether, tripropylene glycol monobutyl ether,
tripropylene glycol monopentyl ether and tripropylene glycol monohexyl ether;
the foam has a closed cell content of 85% or more as determined according to ASTM D6226, and a density of from 10 kg/m3 or more and 100 kg/m3 or less as measured according to BS EN 1602:2013.

* * * * *